United States Patent [19]

Sasamura

[11] Patent Number: 4,495,531
[45] Date of Patent: Jan. 22, 1985

[54] EQUALIZER CIRCUIT FOR SIGNAL WAVEFORM REPRODUCED BY APPARATUS FOR MAGNETIC DIGITAL DATA RECORDING AND PLAYBACK

[75] Inventor: Kouhei Sasamura, Sagamihara, Japan

[73] Assignee: Victor Company of Japan, Limited, Yokohama, Japan

[21] Appl. No.: 473,375

[22] Filed: Mar. 8, 1983

[51] Int. Cl.³ .......................... G11B 5/45; G11B 5/02
[52] U.S. Cl. ........................................ 360/65; 360/67
[58] Field of Search ................................ 560/65, 67

[56] References Cited

U.S. PATENT DOCUMENTS 4,093,965  6/1978  Gish ................................ 360/65
4,110,798  8/1978  Miller et al. ..................... 360/65
4,371,900  2/1983  Huber et al. ..................... 360/65

Primary Examiner—Vincent P. Canney
Attorney, Agent, or Firm—Jordan and Hamburg

[57] ABSTRACT

In an apparatus for magnetic digital data recording and playback, a waveform equalizer circuit thins a signal reproduced from a magnetic recording medium in order to correct a waveform of the signal. Both the gain and phase are designed variable during recording and reproduction of the digital signal, so that the reproduced signal can be equalized under any desired frequency and phase characteristics without intercode interference among solitary waveforms which appear upon magnetic flux reversals.

8 Claims, 16 Drawing Figures

EQUALIZER CIRCUIT FOR SIGNAL WAVEFORM REPRODUCED BY APPARATUS FOR MAGNETIC DIGITAL DATA RECORDING AND PLAYBACK

BACKGROUND OF THE INVENTION

The present invention relates to an apparatus for magnetic digital data recording and playback and, more particularly, to a circuit for equalizing the waveform of a signal which is reproduced from a magnetic recording medium by such an apparatus.

In a recording and playback apparatus of the type described, a magnetic head reproduces a binary coded digital signal from a magnetic tape and feeds the digital signal to a waveform equalizer circuit via an amplifier. The equalizer circuit serves to compensate for the attenuation of high frequency components of the signal which occurs during recording or playback operation. For the compensation, the equalizer circuit removes a skirt portion of the waveform of the input signal thereby preparing a so-called "thinned" signal waveform.

Thinning a signal waveform at the equalizer circuit is effective to suppress interference between waveforms and, therefore, the interference attributable to a decrease in the interval between successive magnetic flux reversals which reduces the margin available for signal detection.

Such a waveform equalizer, however, cannot be constructed to thin a signal beyond a generally accepted limit. Should the input signal be thinned to 60% of the half power width of a solitary waveform in an input signal, the peak level would be lowered by approximately 40%. Thinning an input signal beyond this ratio is difficult and, rather, results in an insufficient performance, i.e., merely serves to lower the peak levels of solitary waveforms. Furthermore, the waveform in this situation will become compensated to such an excessive degree that develops undesirable false peaks.

SUMMARY OF THE INVENTION

It is therefore an object of the present invention to provide an equalizer circuit for a signal waveform reproduced by an apparatus for magnetic digital data recording and playback which is quite simple in construction yet successfully equalizes a waveform under any desired frequency and phase characteristics without intercode interference among solitary waveforms, which appear in response to magnetic flux reversals.

It is another object of the present invention to provide a generally improved equalizer circuit for a signal waveform reproduced by an apparatus for magnetic digital data recording and playback.

An apparatus for equalizing the waveform of a signal reproduced from a magnetic recording medium embodying the present invention includes a phase circuit which varies a phase of a signal passing therethrough. An adder circuit processes the reproduced signal whose waveform is to be equalized. A first integrator circuit integrates an output signal of the adder circuit and varies an integration time constant thereof. A second integrator circuit integrates an output signal of the first integrator circuit. A coefficient circuit adjusts the level of an output signal of the second integrator circuit and supplies an output signal thereof to the adder circuit. The adder circuit processes the reproduced signal and the output signal of the coefficient circuit.

In accordance with the present invention, in a magnetic digital data recording and reproducing apparatus, a waveform equalizer thins a signal reproduced from a magnetic recording medium in order to correct a waveform of the signal. Both the gain and phase are designed variable during recording and reproduction of the digital signal, so that the reproduced signal can be equalized under any desired frequency and phase characteristics without intercode interference between solitary waveforms which appear upon magnetic flux reversals.

Other objects and features, together with the foregoing are attained in the embodiment described in the following description and illustrated in the accompanying drawings.

DESCRIPTION OF THE PREFERRED EMBODIMENT

While the equalizer circuit for a signal waveform reproduced by an apparatus for magnetic digital data recording and playback apparatus of the present invention is susceptible of numerous physical embodiments, depending upon the environment and requirements of use, a substantial number of the herein shown and described embodiment have been made, tested and used, and all have performed in an eminently satisfactory manner.

Figure 1:
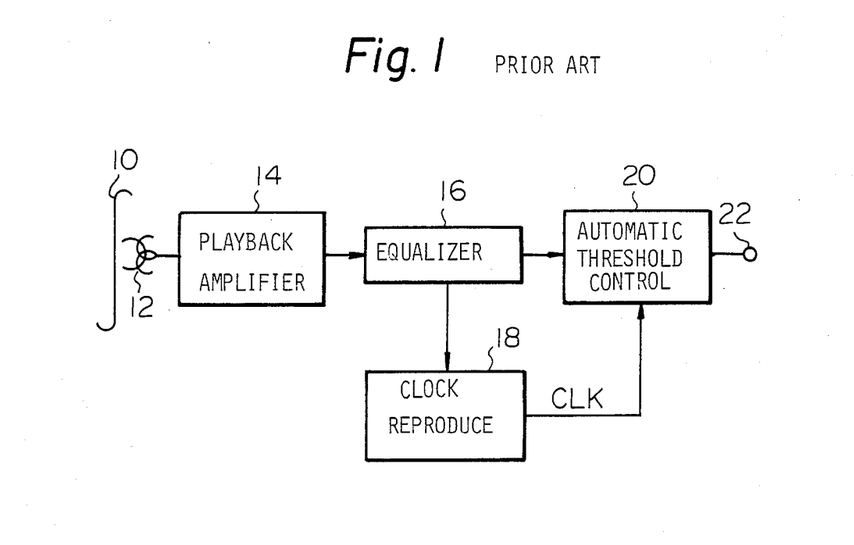
FIG. 1 is a block diagram of a playback system of a prior art apparatus for magnetic digital data recording and playback.

To facilitate understanding of the present invention, a brief reference will be made to a prior art magnetic digital data recording and playback apparatus, particularly its playback system, depicted in FIG. 1. A magnetic tape 10 carries thereon a binary coded digital signal which may have been generated by modulo 2 sum (Exclusive-OR computation) of digital data in one bit of a desired binary code and digital data in another bit two bits ahead thereof. A magnetic head 12 is operated during playback to reproduce the digital signal from the magnetic tape 10. Due to the differential characteristic derived from the characteristic of a winding of the head 12, the reproduced signal waveform appears as a positive pulse when the magnetic flux reverses from the negative to the positive while appearing as a negative pulse when it reverses from the positive to the negative. Such a signal is amplified by a playback amplifier 14 and then processed by a waveform equalizer circuit 16. The equalizer 16 compensates for attenuation of high frequency components which has occurred during recording or playback operation, while converting the signal into a 3-level signal based on the partial response system.

Having signal levels corresponding to "+1", "0" and "−1", the signal is coupled to a clock recovery circuit 18 and an automatic threshold control circuit 20. The clock recovery circuit 18 generates a clock signal CLK in response to timing data extracted from the output signal of the equalizer 16. The threshold control 20 is adapted to process the output signal of the equalizer 16 into the original binary coded digital signal under the control of the clock signal CLK, which is fed thereto from the clock recovery circuit 18. For this purpose, the threshold control 20 transforms the 3-level signal back into a binary signal by determining the signal levels "+1" and "−1" to be both "+1" and the signal level "0" to be "0". During such identification of signal levels, the threshold control 20 generates a control voltage which has a suitable time constant and well follows any amplitude fluctuation in the reproduced signal, thereby setting up an optimum threshold value with which the signal levels are compared. The binary coded digital signal output from the threshold control 20 is fed to an output terminal 22.

Figure 2:
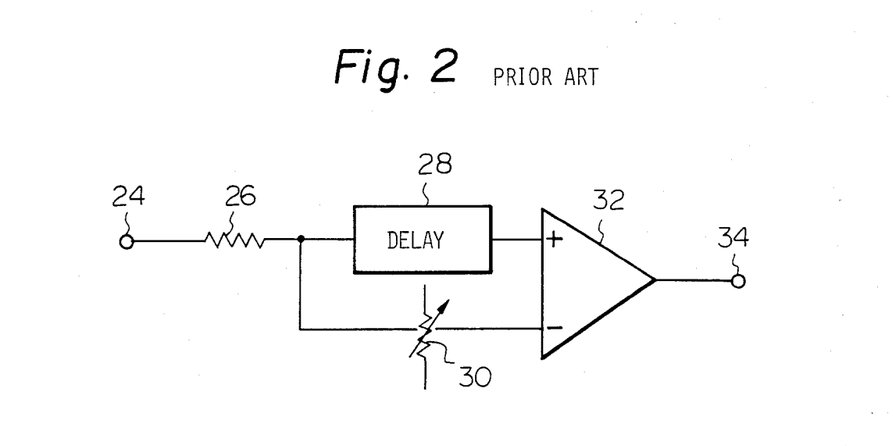
FIG. 2 is a circuit diagram of a prior art waveform equalizer circuit.

Heretofore, the waveform equalizer circuit 16 has been constituted by a cosine type equalizer such as one illustrated in FIG. 2. The signal coming in through an input terminal 24 of the equalizer is delivered via a matching resistor 26 to a delay element 28 having a delay time $\tau$. At the same time, the input signal is coupled to a gain controller 30. The output signal of the delay element 28 is fed to a non-inverting input of an operational amplifier (op amp) 32. When this is expressed in terms of a time function f(t), the input signal at the input terminal 24 may be represented by $f(t+\tau)$. Because the non-inverting input terminal of the op amp 32 is open, the signal f(t) is reflected by the op amp 32 to pass through the delay element 28 and appear as a reflected signal $f(t-\tau)$. This signal $f(t-\tau)$ is added to the input signal $f(t+\tau)$ at the junction between the matching resistor 26 and the delay element 28.

Figure 3A:
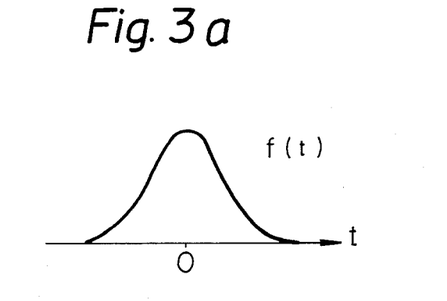
FIG. 3a–3c are diagrams showing waveforms which represent an operation of the equalizer shown in FIG. 2.
Figure 3B:
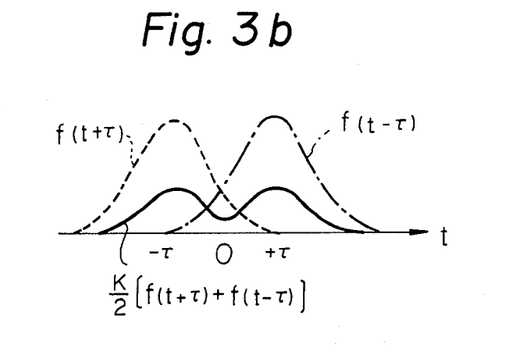
Figure 3C:
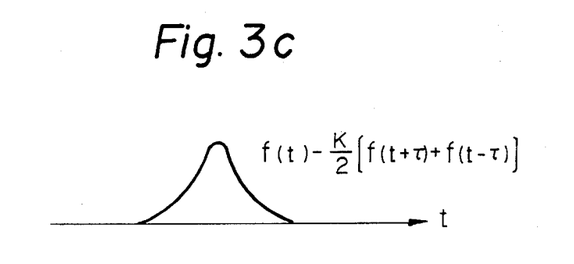

Supposing that the signal f(t) has a solitary wave form as shown in FIG. 3a, for example, then the input signal $f(t+\tau)$ will have a waveform indicated by a dotted line in FIG. 3b while the reflected signal $f(t-\tau)$ will have a waveform indicated by a dash-and-dot line in the same drawing. The sum of the signals $f(t+\tau)$ and $f(t-\tau)$ appearing at the junction between the resistor 26 and the delay element 28, i.e., $f(t+\tau)+f(t-\tau)$, is multiplied by K/2 in amplitude by the gain controller 30 to be provided with such a waveform as one indicated by a solid line in FIG. 3b. The sum signal is coupled to an inverting input of the op amp 32. As a result, the op amp 32 delivers an output signal $f(t)-\{K/2[f(t+\tau)]+f(t-\tau)\}$ whose waveform is shown in FIG. 3c. As seen from FIG. 3c, the waveform of the output signal of the op amp 32 is a so-called thinned version of the input waveform which lacks the skirt portion of the latter. The output of the op amp 32 is fed to an output terminal 34.

Thus, thinning the input waveform is successful to suppress interference between waves thereby suppressing interference due to a decrease in flux reversal interval, which would lower the margine for signal detection. However, the prior art waveform equalizer circuit is not fully satisfactory due to the problems previously discussed.

Reference will be made to FIGS. 4–7 for describing in detail a waveform equalizer circuit embodying the present invention which is a remarkable solution to those problems.

Figure 4:
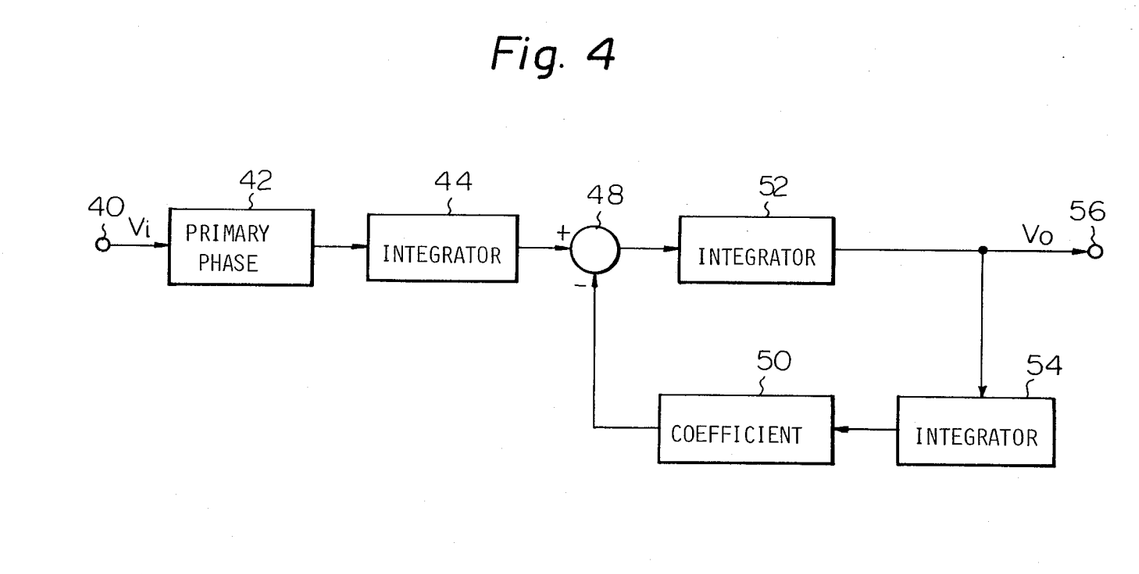
FIG. 4 is a block diagram of an embodiment of a wave form equalizer circuit of the present invention.
Figure 5:
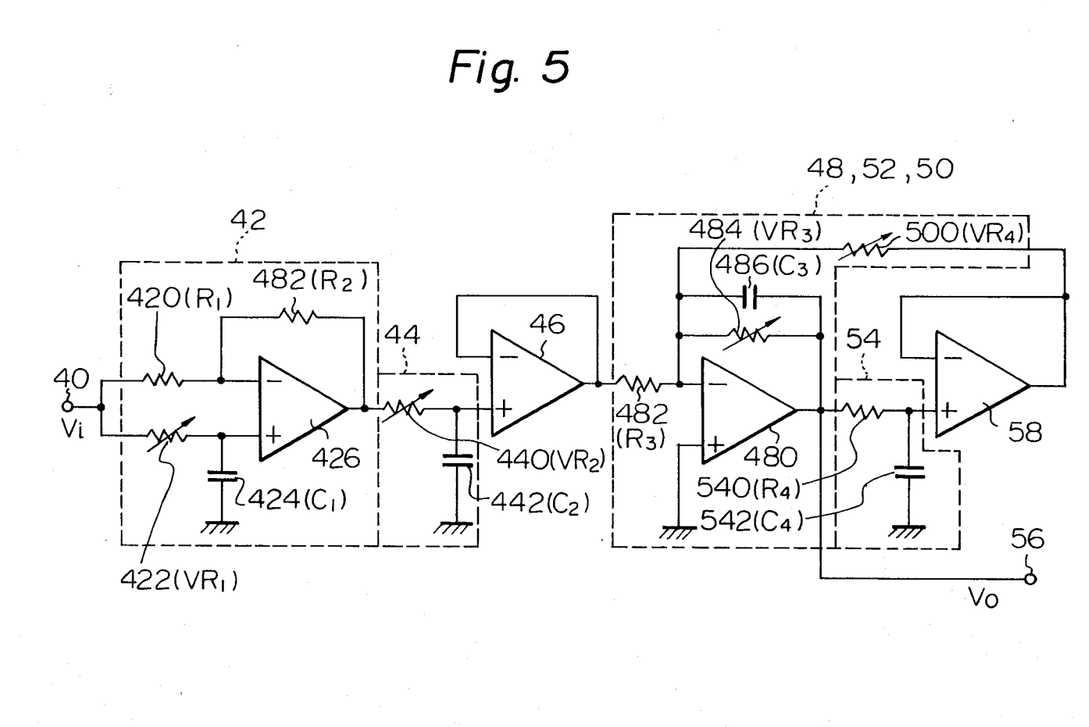
FIG. 5 is a circuit diagram showing a practical construction of the equalizer circuit of FIG. 4.

Referring to FIGS. 4 and 5, an equalizer circuit is shown in block diagram and a practical example thereof in circuit diagram. The equalizer circuit has an input terminal 40 to which is fed an input signal $V_i$ which may be a signal given by reproducing a digital signal from a magnetic tape by a magnetic head (not shown). The input signal $V_i$ is coupled to a primary phase circuit 42 having a transfer function $G_1(s)$. As shown in FIG. 5, the primary phase circuit 42 is made up of a resistor 420 having a resistance $R_1$, a variable resistor 422 having a resistance $VR_1$, a capacitor 424 (capacity $C_1$) which cooperates with the variable resistor 422 as an integrator circuit, an op amp 426, and a resistor 428 having a resistance $R_2$ and connected between an output terminal and an inverting input of the op amp 426. The signal $V_i$ coming in through the input terminal 40 is fed to the inverting input of the op amp 426 via the resistor 420 and a non-inverting input of the op amp 426 via the variable resistor 422.

The transfer function $G_1(s)$ of the primary phase circuit 42 is thus expressed as:

$$G_1(s) = \frac{s - 1/T_1}{s + 1/T_1} \qquad \text{Eq. (1)}$$

where the integration time constant $T_1 = VR_1 \cdot C_1$.

The signal output from the op amp 426 in the primary phase circuit 42 is supplied to an integrator circuit 44 having a transfer function $G_2(s)$. The integrator circuit 44, as shown in FIG. 5, comprises a variable resistor 440 having a resistance $VR_2$, and a capacitor 442 which is connected at one end to ground and, at the other end, to the junction between a variable resistor 440 and a non-inverting input of an op amp 46. The capacitor 442 has a capacity $C_2$. The transfer function $G_2(s)$ is expressed as:

$$G_2(s) = \frac{1}{1 + sT_2} \qquad \text{Eq. (2)}$$

where the integration time constant $T_2 = VR_2 \cdot C_2$.

The integrator circuit 44 provides the input signal with such a characteristic that it remains substantially flat in the low frequency range but becomes attenuated in the high frequency range above a specific cutoff frequency which is determined by the integration time constant $T_2$. The output of the integrator 44 is subjected to impedance conversion at the op amp 46 which serves the function of a voltage follower. The output of the op amp 46 is processed by an adder circuit 48 for subtraction thereof with a signal output from a coefficient circuit 50. Further, the output of the adder circuit 48 is supplied to an integrator circuit 52 whose transfer function is $G_3(s)$. The output of the integrator 52 is fed through a farther integrator circuit 54 having a transfer function $F_4(s)$ to the coefficient circuit 50 while being delivered to an output terminal 56 as an output signal $V_o$.

As shown in FIG. 5, the output of the op amp 46 is connected to a resistor 482 having a resistance $R_3$ which is in turn connected to an inverting input of an op amp 480. A parallel connection of a variable resistor 484 having a resistance $VR_3$ and a capacitor 52 having a capacity $C_3$ is connected between an output and the inverting input of the op amp 480. It will be seen that the op amp 480, resistor 482 and parallel resistor-capacitor connection mentioned constitute the adder circuit 48 and integrator circuit 52 in combination. Therefore, the transfer function $G_3(s)$ of the integrator 52 may be expressed as:

$$G_3(s) = \frac{VR_3}{R_3} \cdot \frac{1}{1 + s \cdot T_3} \quad \text{Eq. (3)}$$

where the integration time constant $T_3 = VR_3 \cdot C_3$.

Further, a resistor 540 is connected between the output of the op amp 480 and a non-inverting input of an op amp 58 and provided with a resistance $R_4$. A capacitor 542 having a capacity $C_4$ is connected at one end to ground and at the other end to the junction between the resistor 540 and the non-inverting input of the op amp 58. The resistor 540 and capacitor 542 serve as the integrator circuit 54 in combination. An output of the op amp 58 is connected to the non-inverting input thereof and to the inverting input of the op amp 480 via a variable resistor 500 having a resistance $VR_4$. In this network, the op amp 58 serves as a voltage follower while the variable resistor 500 constitutes the coefficient circuit 50 in combination with the resistor 482. Therefore, the transfer function $G_4(s)$ of the integrator 54 and the transfer function K of the coefficient circuit 50 may be respectively produced by the following equations:

$$G_4(s) = \frac{1}{1 + s \cdot T_4} \quad \text{Eq. (4)}$$

where the integration time constant $T_4 = R_4 \cdot C_4$, and $$K = \frac{R_3}{VR_4} \quad \text{Eq. (5)}$$

From the above, it follows that the transfer function $G_0(s)$ of the whole equalizer circuit shown in FIGS. 4 and 5 obtained as:

$$G_0(s) = \frac{s - 1/T_1}{s + 1/T_1} \cdot \frac{1}{1 + sT_2} \cdot \frac{\frac{VR_3}{R_3} \cdot \frac{1}{1 + sT_3}}{1 + \frac{VR_3}{R_3(1 + sT_3)} \cdot \frac{1}{1 + sT_4} \cdot \frac{R_3}{VR_4}} = \quad \text{Eq. (6)}$$

$$\frac{s\left(s - \frac{1}{T_1}\right) \cdot \frac{1}{R_3 C_3}}{\left(s + \frac{1}{T_1}\right)(1 + sT_2) \cdot \left(s^2 + \frac{1}{VR_3 \cdot C_3}\right)\left(s + \frac{1}{R_4 \cdot VR_4 \cdot C_3 \cdot C_4}\right)}$$

where $G_4(s) \approx 1/sT_4$.

Eq. (6) gives center frequency $f_0$, Q and again A at the center frequency $f_0$ as follows:

$$f_0 = \frac{1}{2\pi \sqrt{R_4 \cdot VR_4 \cdot C_3 \cdot C_4}} \quad \text{Eq. (7)}$$

$$Q = \frac{VR_3}{\sqrt{R_4 \cdot VR_4 \cdot C_4/C_3}} \quad \text{Eq. (8)}$$

$$A = \frac{VR_3}{R_3(1 + sT_2)} \quad \text{Eq. (9)}$$

where $R_1 = R_2$.

Figure 6A:
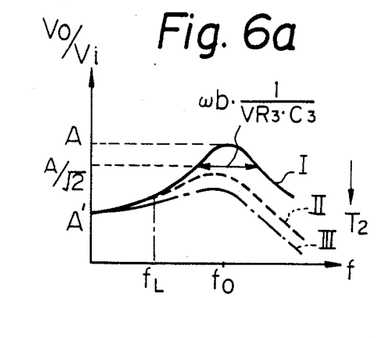
FIGS. 6a–6d are plots demonstrating a frequency characteristic, a phase characteristic and frequency characteristics of part of the equalizer circuit, respectively.

The frequency characteristic achievable with this embodiment is represented by a solid curve I in FIG. 6a, which is produced by the Eqs. (7)–(9). Here, a half power width $\omega_b$ is $1/(VR_3 \cdot C_3)$. In FIG. 6a, $f_L$ represents a cutoff frequency determined by the integration time constant $T_4$ and is equal to a cutoff frequency $f_L$ of the frequency characteristic of the integrator 54, depicted in FIG. 6c. The frequency characteristic curve I in this embodiment remains substantially flat in the low frequency range below the cutoff level $f_L$ and its gain A' is produced by:

$$\frac{V_o}{V_i} = G_1(s) \cdot \frac{K'}{sT_3 + K' \cdot K + 1} \quad \text{Eq. (10)}$$

$$= G_1(s) \cdot \frac{K'}{k\left(\frac{T_3}{k} s + 1\right)}$$

where $K' = VR_3/R_3$, $k = K'K + 1$ and $G_2(s) = 1$. Therefore, $$A' = \frac{K'}{k} \quad \text{Eq. (11)}$$

It will be seen from the Eq. (9) that the frequency characteristic I undergoes progressive variation as the integration time constant $T_2$ becomes larger, as indicated by a dashed line II and a dash-and-dot line III in FIG. 6a. Curves shown in FIG. 6d represent progressive variation of the characteristic of the transfer function $G_0(s)$ in accordance with the integration time constant $T_2$. As seen from the Eq. (7), the resistance $VR_4$ of the variable resistor 500 is adjustable to vary the center frequency $f_0$ as may be desired to set up a certain frequency characteristic for equalization purpose. Another approach for such a variable center frequency $f_0$ may be constructing either one of the resistor 540 and capacitors 486 and 542 such that the resistance $R_4$ or the capacitance $C_3$ or $C_4$ is controllable.

While making the center frequency $f_0$ variable also makes Q variable as will be understood from the Eq. (8), Q is adjustable as desired through the resistance $VR_3$ of the variable resistor 484 due to the unchanged bandwidth and by employing a predetermined value for the frequency $f_0$.

Figure 6B:
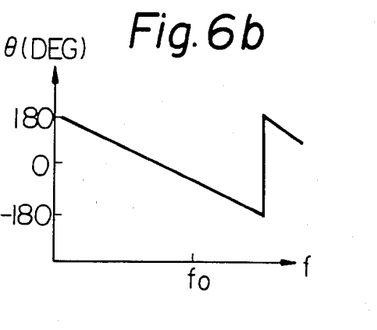
Figure 6C:
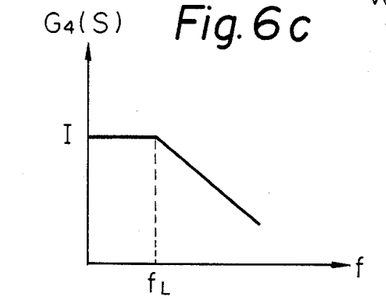
Figure 6D:
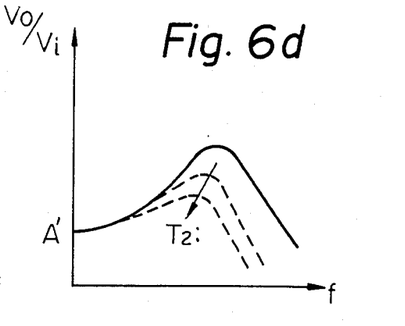

The phase characteristic particular to the embodiment shown and described is plotted in FIG. 6b. The plot teaches that the phase characteristic can be so determined as to achieve linearity in a desired frequency range.

In this manner, the resistances $VR_1$, $VR_2$, $VR_3$ and $VR_4$ of the variable resistors 422, 440, 484 and 500 are open to adjustment to achieve any desired frequency and phase characteristics optimum for equalization.

Supposing that the equalization characteristic to be compensated which is necessary for equalizing the waveform of a reproduced signal is represented by G(s), then this characteristic G(s) is expressed as:

$$G(s) = \frac{R(s)}{H(s)} \qquad \text{Eq. (12)}$$

where R(s) is the transmission bandwidth necessary for transmitting a reproduced signal without intercode interference, and H(s) is the characteristic of a signal obtained by recording and reproducing a digital signal by means of a magnetic head and a magnetic tape.

Figure 7:
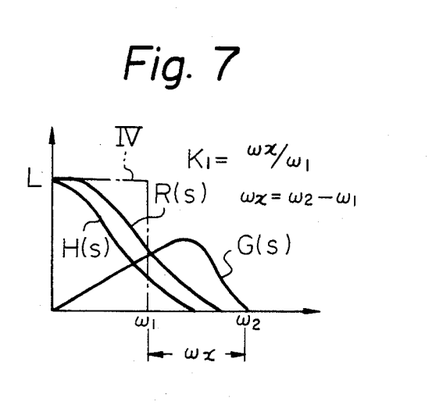
FIG. 7 is a plot showing a frequency characteristic which is necessary for a waveform equalizer circuit.

Referring to FIG. 7, the relationship indicated by the Eq. (12) is graphically shown. The dash-and-dot line IV in FIG. 7 represents the ideal low-pass characteristic for a cutoff frequency $f_1$ (angular frequency $\omega_1 = 2\pi F_1$). The ideal low-pass characteristic IV becomes a sinusoidal rolloff characteristic as the transmission characteristic which practically makes interference zero. Where the ratio of an angular frequency $\omega_x$ to the angular frequency $\omega_1$ shown in FIG. 7, $\omega_x/\omega_1$, is supposed to be a constant $K_1$, a full-cosine rolloff characteristic is attained when $K_1 = 1$; this is extensively utilized for base band transmission. With respect to the angular frequency $\omega_1$, the transmission bandwidth R(s) is cut off to the sinusoidal characteristic. Under the condition $K_1 < 1$, the bandwidth R(s) may be narrowed due to the decrease in the angular frequency $\omega_2$, while the cutoff characteristic grows sharp so that overshoot becomes prominent in a solitary waveform occurring upon flux reversal during playback. Still, intercode interference is not observed between different peak levels. Here, the sum of the angular frequencies $\omega_1$ and $\omega_x$ is $\omega_2$.

Thus, the bandwidth R(s) or coefficient $K_1$ is determined by the signal characteristic H(s) and in turn determines the equalization characteristic G(s) based on the Eq. (12). As a result, the equalization characteristic is attainable by setting up a relation $G_0(s) = G(s)$ from the Eq. (6). The phase characteristic provided by the relation shown in FIG. 7 needs be free from distortion in transmission up to the angular frequency $\omega_2$ as long as $K_1 = 1$ and such is readily achieved in accordance with the present invention. This will contribute a great deal to an improvement in the margine required for signal detection.

In summary, it will be seen that the present invention provides a waveform equalizer circuit in which both the gain and phase are adjustable to afford desired frequency and phase characteristics with ease, so that when the input signal is a solitary wave, its half power width can be thinned down to about ⅓ to ¼ without any substantial decrease in peak level. Additionally, waveform can be equalized optimumly without intercode interference between solitary waveforms during flux reversals even under any desired condition in which $K_1 < 1$, to match it with any playback characteristics. Furthermore, where a magnetic head has multiple tracks and binary coded digital signals are to be recorded and reproduced track by track, the different playback characteristics of the various tracks can be matched easily. This will well make up for the deterioration of characteristics which originates from the ever increasing density of tracks.

Figure 8:
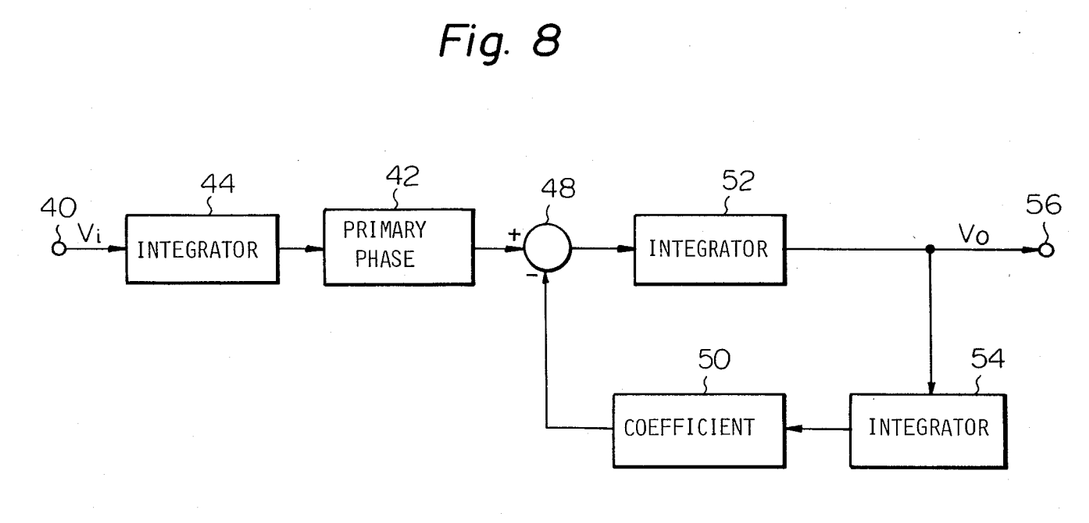
FIGS. 8–11 are block diagrams of various modifications to the waveform equalizer circuit of FIG. 4.
Figure 9:
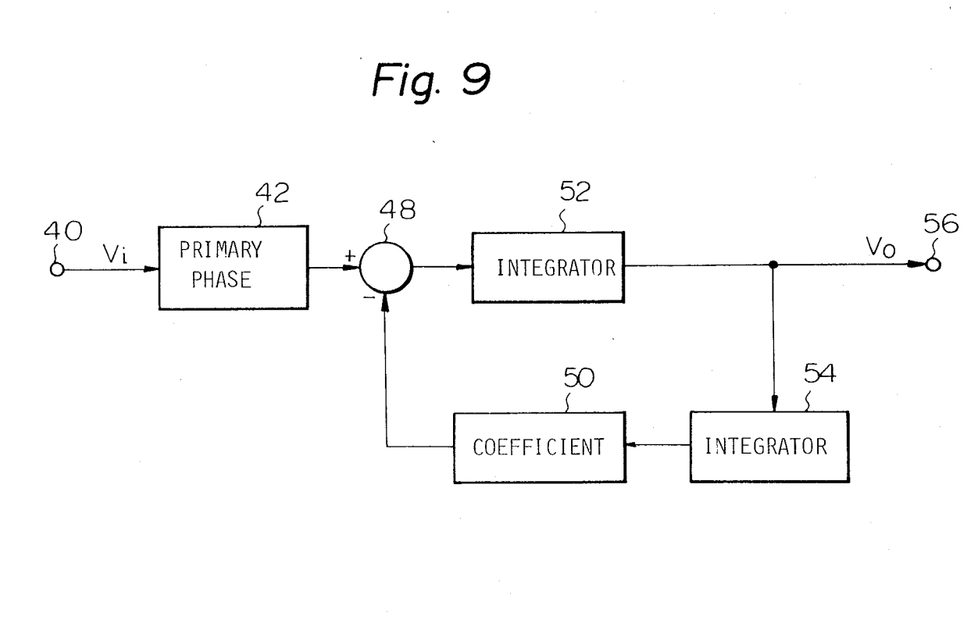
Figure 10:
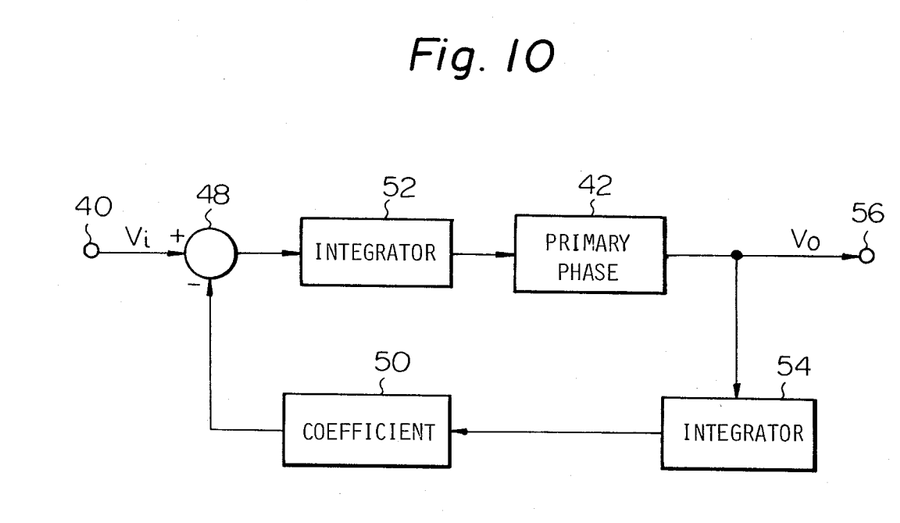
Figure 11:
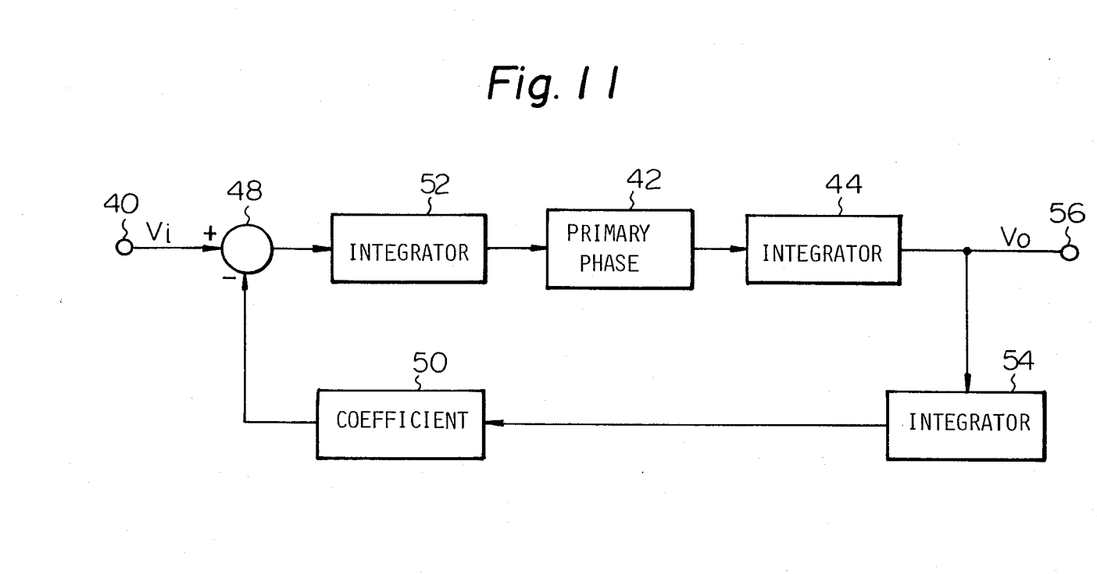

Various modifications will become possible for those skilled in the art after receiving the teachings of the present disclosure without departing from the scope thereof. For example, as shown in FIG. 8, the transfer function $G_0(s)$ of the Eq. (6) may be obtained by reversing the positions of the primary phase circuit 42 and integrator circuit 44 shown in FIGS. 4 and 5. The integrator circuit 44 may even be omitted altogether, as shown in FIG. 9. Further, as shown in FIG. 10, the terminal 40 may be directly connected to the adder circuit 48 and the primary phase circuit 42 may be connected between the integrator circuit 52 and output terminal 56. Furthermore, as shown in FIG. 11, the integrator circuit 44 xay be connected between the primary phase circuit 42 and output terminal 56 in FIG. 10.

Because the gist is to vary the integration time constants $T_1$, $T_2$ and $T_3$, the variable resistors 422, 440 and 484 may be replaced by fixed resistors if the capacitors 424, 442 and 486 are provided with variable capacities.

The coefficient circuit 50 may comprise a variable subtractor or a variable gain amplifier instead of the resistor 500, although a fixed resistor is necessary in place of the resistor 500 which is to be connected to the compute circuit 48. Further, the coefficient circuit 50 may be provided with a fixed coefficient.

What is claimed is:

1. An apparatus for equalizing the waveform of a signal reproduced from a magnetic recording medium, comprising:
    a phase circuit for varying a phase of a signal passing therethrough;
    an adder circuit for processing the reproduced signal whose waveform is to be equalized;
    a first integrator circuit for integrating an output signal of said adder circuit and varying an integration time constant thereof;
    a second integrator circuit for integrating an output signal of said first integration circuit; and
    a coefficient circuit for adjusting the level of an output signal of said second integrator circuit and supplying an output signal thereof to the adder circuit, the adder circuit processing the reproduced signal and the output signal of said coefficient circuit.

2. An apparatus as claimed in claim 1, further comprising an input terminal and an output terminal.

3. An apparatus as claimed in claim 2, in which the input terminal is directly connected to the phase circuit while the output terminal is connected to the first integrator circuit, the reproduced signal being delivered and processed as passing through the phase circuit, the adder circuit and the first integrator circuit in this sequence.

4. An apparatus as claimed in claim 2, in which the input terminal is directly connected to the adder circuit while the output terminal is connected to the phase circuit, the reproduced signal being delivered and processed as oassing through the adder circuit, the first integrator circuit and the phase circuit in this sequence.

5. An apparatus as claimed in claim 1, further comprising a third integrator circuit which is directly connected to the phase circuit.

6. An apparatus as claimed in claim 5, further comprising an input terminal and an output terminal.

7. An apparatus as claimed in claim 6, in which the input terminal is directly connected to the phase circuit while the output terminal is connected to the first integrator circuit, the reproduced signal being delivered and processed as passing through the phase circuit, the third integrator circuit, the adder circuit and the first integrator circuit in this sequence.

8. An apparatus as claimed in claim 6, in which the input terminal is directly connected to the adder circuit while the output terminal is connected to the third integrator circuit, the reproduced signal being delivered and processed as passing through the adder circuit, the first integrator circuit, the phase circuit and the third integrator circuit in this sequence.

* * * * *